May 23, 1967     F. E. FARLEY ET AL     3,320,727
PORTABLE VACUUM CLEANING MACHINE
Filed Aug. 2, 1965
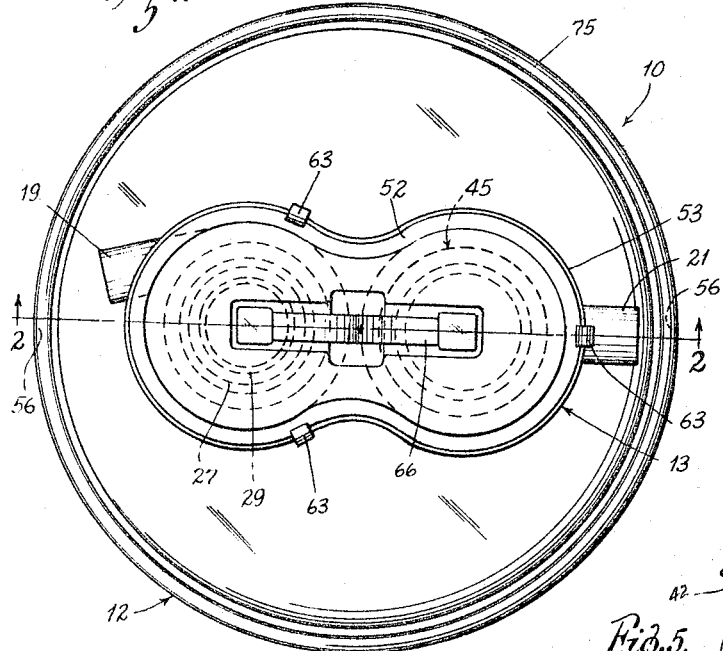
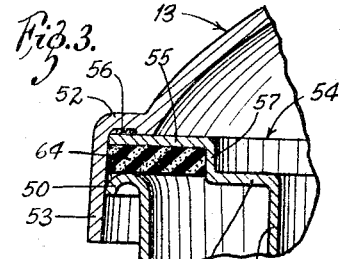
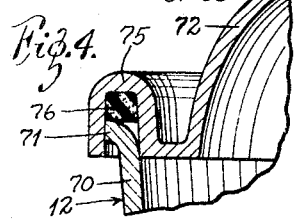
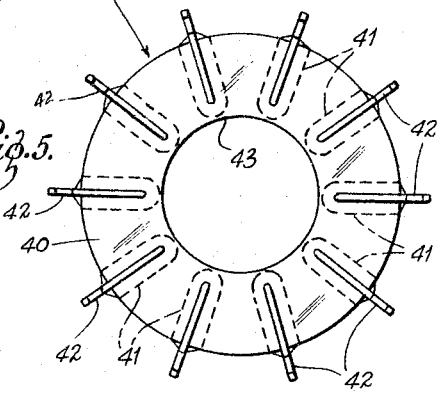
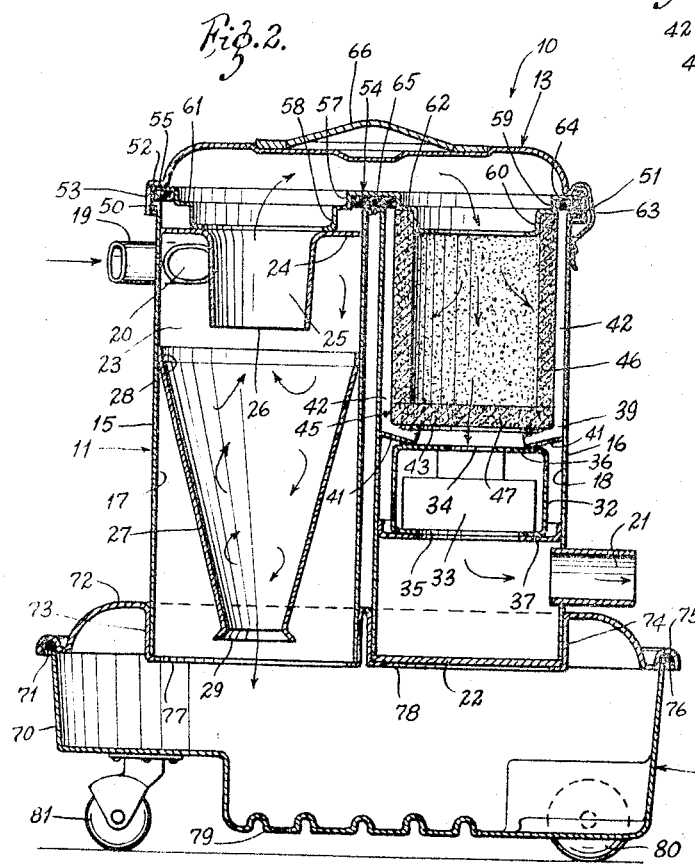
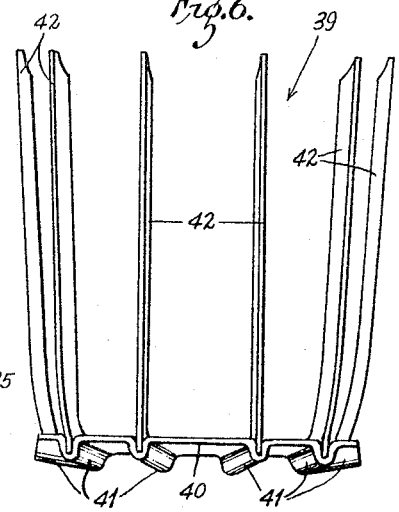
INVENTORS:
FORNEY E. FARLEY,
HAROLD W. McCULLOCH
BY Kingsland, Rogers,
Ezell, Eilers & Robbins
ATTORNEYS

United States Patent Office 3,320,727
Patented May 23, 1967

3,320,727
PORTABLE VACUUM CLEANING MACHINE
Forney E. Farley, Dallas, and Harold W. McCulloch, Mesquite, Tex., assignors to John E. Mitchell Company, Dallas, Tex., a corporation of Missouri
Filed Aug. 2, 1965, Ser. No. 476,570
1 Claim. (Cl. 55—337)

This invention relates to a vacuum cleaner, and particularly to a portable vacuum cleaner of effective, but compact design and construction.

In general, this portable vacuum cleaner comprises a housing which rests upon a dirt receptacle tank. The receptacle tank is mounted on wheels. The housing contains dirt separating and filtering devices which deposit most of the dirt into the receptacle tank. When the housing is lifted away, the dirt can be removed from the receptacle tank. A removable cover provides access to the inside of the housing. To house the separating and filter and filter devices, the housing has two chambers. There is a cyclone separator in one of the chambers. An air inlet opens tangentially into the cyclone separator. A hose is intended to be connected to the inlet for delivering dirt laden air to the inlet. At the inlet, the cyclone separator chamber has an annular channel that is closed at its upper end and open at its lower end, and the air entering the chamber swirls around the channel. The channel opens into the larger upper end of an inverted frusto-conical member, the lower open end of which discharges dirt and other foreign matter directly into the receptacle tank. As the dirt falls downwardly, the air is drawn upwardly and is directed to the other chamber.

In the other chamber, there is a cup-shaped polyurethane filter. The polyurethane filter is closely fitted against a frame element carried by the cover and rests against a plurality of spaced plastic spacer ribs. The spacer ribs support the filter element while keeping it spaced from the wall of the second chamber.

When the housing is lifted from the receptacle tank, the dirt and foreign matter in the receptacle tank can be quickly disposed of and the housing replaced. Also, access to the filter element is easy upon quick removal of the cover. The filter element may be vacuumed or washed and replaced for continued use of the machine.

The principal object of the invention is to provide a compact vacuum cleaner with efficient cyclone separator and filter chambers arranged to handle inflowing air in series for bulk separation of dirt from the air followed by fine filtering of the air.

Another object of the invention is to provide a portable vacuum cleaner that has a housing removably supported on a receptacle tank and that has a removable cover for providing access to cyclone separator and filter chambers, thereby permitting quick emptying of the receptacle tank and easy access to the filter element for replacement or cleaning of it.

Another object of the invention is to provide a portable vacuum cleaning machine that has cyclone separator and filter chambers arranged to act serially on incoming air, wherein the filter chamber has a cup-shaped polyurethane filter element into the center of which air is drawn for filtering the air, the air being drawn by a pump positioned below the filter element, whereupon removal of the filter element removes all dirt and foreign material without permitting the dirt and foreign material to contact the pump.

Other objects and advantages will be apparent to those skilled in the art.

In the drawing:

FIGURE 1 is a top plan view of the portable vacuum cleaner;

FIGURE 2 is a view in section taken along the line 2—2 of FIGURE 1;

FIGURE 3 is an enlarged fragmentary view in section of the area joining the housing and the cover;

FIGURE 4 is an enlarged fragmentary view in section of the area joining the housing and the dirt receptacle tank;

FIGURE 5 is an enlarged top plan view of the cage which supports the filter cup; and FIGURE 6 is an enlarged side elevation view of the cage.

Referring now to the drawing, the portable vacuum cleaner 10 comprises a housing 11 which rests upon a dirt receptacle tank 12. A lid 13 fits onto the upper end of the housing 11.

The housing is formed with two cylindrical walls 15 and 16, the inner surfaces 17 and 18 of which define cylindrical chambers. A short pipe 19 extends tangentially through the wall 15 adjacent the upper end of the chamber 17 to provide a tangential inlet opening 20. An outlet pipe 21 extends through the other chamber wall 16 near its lower end to provide an outlet. There is a plate 22 forming a bottom for the cylinder 16.

The inlet 20 opens into an annular channel 23 having an upper wall 24 extending inwardly from the wall 15 and joined at its inner edge to an inner downwardly extending sleeve 25. The lower edge 26 of the sleeve 25 is positioned well below the inlet opening 20.

Spaced below the lower edge 26 of the sleeve 25 is an inverted frusto-conical member 27. The upper end 28 of the member 27 is joined to the cylindrical wall 15. The lower end 29 of the frusto-conical member 27 is flared outwardly and is positioned just above the lower end of the chamber 17.

In the other chamber 18, there is a suitable frame 32 positioned just above the outlet pipe 21 and shaped to support a motor-driven air pump 33. The frame 32 has openings 34 and 35 in its upper and lower sides 36 and 37, respectively, so that air can flow freely through the frame as the pump operates.

A filter support cage 39 rests upon the frame 32. The cage 39 is best shown in FIGURE 6 as having an annular base 40 with downwardly projecting beads 41 adapted to rest against the upper wall 36 of the frame 32. The base 40 and beads 41 are slightly inclined, as shown in FIGURES 2 and 6. The spaces between the beads 41 provide passages for air. The beads 41 also clamp the lower ends of a plurality of generally vertical ribs 42. The ribs 42 are slightly flared outwardly until confined within the cylindrical wall 16, and therefore, the ribs 42 press against the wall 16. There is an opening 43 through the base 40 through which air can flow.

A polyurethane filter element 45 fits within the cage. The filter element 45 has a cylindrical side wall 46 and a flat bottom wall 47. The wall 47 is glued to the wall 46 to provide a closed cup member, the cylindrical side 46 of which bears against the ribs 42. The outer edges of the bottom wall 47 of the filter element rests against the base 40. As FIGURE 2 shows, the spaces between the ribs 42 provide air flow areas between the cylindrical wall 16 and the side 46 of the filter element 45.

The upper edge 50 of the wall 15 is turned over as is the upper edge 51 of the wall 16. The cover 13 has a horizontal flange portion 52 and a short downwardly extending wall 53 around its entire perimeter. As FIGURE 2 shows, the wall 53 fits along the outer side of the beads 50 and 51. A member 54 has an outer horizontal plate element 55 cemented to the horizontal portion 52 at 56 as shown in FIGURE 3.

There are two separate sections of the member 54 which step downwardly into successively smaller diameter coaxial cylinders 57 and 58 and 59 and 60, respectively.

The cylinders 57 and 58 are joined by an annular shoulder 1, and the cylinders 59 and 60 by an annular shoulder 62. The cylinder 58 rests upon the plate 24 defining the upper end of the channel 23. The cylinder 60 projects into the other chamber 18 and is positioned on the inner side of the upper end of the cylindrical filter wall 46. The shoulder 62 is positioned on top of the wall 46.

There are suitable clamps 63 of unconventional design that hold the cover 13 against the housing 11. Gaskets 64 and 65 provide airtight seals when the cover is in place. There is a handle 66 on the cover to facilitate removal of the cover and lifting of the housing 11 when the clamps 63 are locked.

The dirt receptacle 12 has a generally cylindrical side wall 70 with an annular outwardly extending flange 71. A base 72, which has wells 73 and 74 cemented to the walls 15 and 16, also has an annular channel 75. As best seen in FIGURE 4, a gasket 76 is glued within the channel 75, and the gasket rests upon the shoulder 71. There are openings 77 and 78 through the wells 73 and 74, respectively, although the bottom 22 of the cylinder 16 covers the opening 78.

The receptacle 12 has a ribbed lower wall 79 for added strength. It is supported on two rear wheels 80 and a swivelled front wheel 81.

In operation, the inlet pipe 19 is connected to a suitable hose having a cleaning head on it, and the pump 33 is actuated to draw air through it. Air is drawn through the inlet pipe 19 and the inlet port 20, and this dirt-carrying air swirls around at a high rate within the channel 23. As the air swirls around it moves downwardly toward the lower end 26 of the sleeve 25 and heavy foreign matter falls downwardly into the receptacle 12. The air continues through the sleeve 25 and through the passage defined by the cover 13 and is drawn into the interior of the cup-shaped filter element 45. The air is drawn through the filter element from the inner side to the outer side and through the opening 34 of the frame 32 until it is discharged through the outlet pipe 21. The filter 45 filters all of the finer particles of foreign matter that were not separated by the cyclone separator section within the chamber 15.

Since the ribs 42 space the side wall 46 of the cup-shaped filter 45 from the wall 16, air can pass through the side wall 46 as well as through the bottom wall 47. This increases the efficiency and effectiveness of the filter 45. Also, since air passes from within to without the cup-shaped filter 45, removal of the filter 45 for cleaning removes all of the trapped dirt and foreign matter and none of this dirt and foreign matter falls into contact with the pump 33.

Since the cover 13 not only provides quick access to the filter 45 and the cyclone separator chamber 17, but also provides a portion of the passage from the chamber 17 to the chamber 18, greater compactness of the overall machine is achieved. Also, since the housing 11 rests upon the receptacle 12, no latches are needed for fastening the housing to the receptacle 12.

Various changes and modifications may be made within the purview of this invention as will be readily apparent to those skilled in the art. Such changes and modifications are within the scope and teaching of this invention as defined by the claim appended thereto.

What is claimed is:

A portable vacuum cleaning machine comprising a housing, side wall means defining first and second chambers within the housing, an inlet port opening tangentially to the upper end of the first chamber, an annular channel confining incoming air at the inlet port to an annular path, the annular channel terminating at a plane spaced vertically below the inlet port, an inverted frusto-conical member mounted in the first chamber below the channel for receiving the swirling air and for permitting foreign matter to fall downwardly while permitting the air to be drawn upwardly through the center of the element defining the annular channel, a cover removably mounted on the housing, means on the cover defining a passage for air, the passage having an inlet above and in communication with the center of the element defining the annular channel and an outlet above and in communication with the second chamber, a foam filter element in the second chamber, the filter element being cup-shaped with a generally cylindrical side wall surrounding and defining a central space and a bottom wall in contact with the lower edges of the side wall, the upper end of the filter element being open to provide direct communication between the central space and the outlet from the air passage in the cover, means between the filter element and the side wall means of the second chamber to support the filter element in the second chamber and hold the side wall means of the filter element in spaced relation to the side wall means of the second chamber, the filter supporting means comprising a plurality of spaced ribs between the side wall of the filter element and the side wall means of the second chamber and extending below the bottom wall of the filter element, means to support the ribs within the second chamber, air passages through the filter supporting means, a pump in the second chamber positioned below the bottom wall of the filter element to draw air serially through the inlet port, the annular channel, the passage in the cover, and filter element, the passage defining means also providing an annular stop for bearing against the upper end of the filter and blocking the flow of air from the air passage in the cover to all portions of the second chamber which are radially beyond the side wall of the filter element to cause the air to flow through the filter rather than around it, and an outlet port below the pump for discharging clean air from the housing, a dirt receptacle, the dirt receptacle having side and bottom wall means and upper edges defining an open upper end, the housing having lower edges complementary with the upper edges of the dirt receptacle to provide interfitting engagement therebetween while permitting the housing to be lifted free of the dirt receptacle, and an opening from the first chamber below the inverted frusto-conical member and communicating with the dirt receptacle, the receptacle being supported on wheels.

References Cited by the Examiner

UNITED STATES PATENTS

| | | | |
|---|---|---|---|
| 2,582,219 | 1/1952 | Ardito et al. | 55—373 |
| 2,943,698 | 7/1960 | Bishop | 55—337 |
| 3,164,456 | 1/1965 | Brainerd et al. | 55—521 X |
| 3,177,635 | 4/1965 | Cawl et al. | 55—337 X |
| 3,184,778 | 5/1965 | Lindberg et al. | 55—378 X |

FOREIGN PATENTS

| | | |
|---|---|---|
| 737,457 | 9/1955 | Great Britain. |
| 1,079,958 | 4/1960 | Germany. |

HARRY B. THORNTON, *Primary Examiner.*

ROBERT F. BURNETT, *Examiner.*

D. K. DENENBERG, D. TALBERT, *Assistant Examiners.*